(12) United States Patent
Rennie et al.

(10) Patent No.: US 7,720,331 B2
(45) Date of Patent: May 18, 2010

(54) METHODS AND APPARATUS FOR USE WITH OPTICAL FIBRES

(75) Inventors: Andrew James Rennie, Havant (GB);
Trevor White, Fordingbridge (GB);
Christel Rousseau, Maidenhead (GB);
Ian Peter Alcock, Petersfield (GB)

(73) Assignee: Point Source Limited (GB)

( * ) Notice: Subject to any disclaimer, the term of this patent is extended or adjusted under 35 U.S.C. 154(b) by 408 days.

(21) Appl. No.: 11/740,549

(22) Filed: Apr. 26, 2007

(65) Prior Publication Data
US 2008/0175537 A1 Jul. 24, 2008

(30) Foreign Application Priority Data
Jan. 19, 2007 (GB) .................................. 0701093.7

(51) Int. Cl.
*G02B 6/42* (2006.01)
*G02F 1/335* (2006.01)
*G02B 6/26* (2006.01)
(52) U.S. Cl. ................... 385/27; 385/1; 385/7; 385/28; 385/32; 385/39; 385/123
(58) Field of Classification Search .................... 385/1, 385/4, 7, 27–28, 32, 39, 123
See application file for complete search history.

(56) References Cited

U.S. PATENT DOCUMENTS
4,229,067 A 10/1980 Love
5,708,736 A * 1/1998 Steinblatt ...................... 385/28

FOREIGN PATENT DOCUMENTS

| DE | 3411272 | 3/1984 |
|---|---|---|
| DE | 3405573 | 8/1985 |
| GB | 2405488 | 3/2005 |
| WO | WO9815073 | 4/1998 |

OTHER PUBLICATIONS

Mode Scrambler, Photonics and Instrumentation, p. 427, Newport Corporation, www.newport.com.
UK Intellectual Property Office Search Report, dated Nov. 15, 2007 for GB0701093.7.
UK Examination Report dated Apr. 2, 2009, UK Patent Application No. GB0800998.7.

* cited by examiner

*Primary Examiner*—Frank G Font
*Assistant Examiner*—Michael P Mooney
(74) *Attorney, Agent, or Firm*—Vierra Magen Marcus & DeNiro LLP (57) ABSTRACT

An apparatus for performing mode scrambling in a multi-mode optical fibre 1 comprises an electromechanical transducer 3 and a signal generator 9. A portion of the fibre 1, which is in the form of a loop 5, is arranged with its ends 6 fixed to the transducer 3, but with the remainder of the portion being left free to vibrate. The signal generator 9 drives the transducer 3 so as to form a succession of bends of differing bend radii in the portion of the fibre as a beam of electromagnetic radiation travels through the fibre, thereby "scrambling" the beam as it travels through the fibre.

22 Claims, 3 Drawing Sheets

METHODS AND APPARATUS FOR USE WITH OPTICAL FIBRES

CLAIM OF PRIORITY TO FOREIGN APPLICATION

This application claims the benefit of U.K. Patent Application No. 0701093.7, dated Jan. 19, 2007.

BACKGROUND

The present invention relates to methods and apparatus for use with optical fibres, and in particular to methods and apparatus that may be used for optical fibre mode scrambling.

As is known in the art, optical fibres for carrying electromagnetic radiation (such as laser light) can principally have two forms, so-called "single mode" and "multimode" fibres. A "mode" can be thought of as a small range of angles within an optical fibre core that a beam of electromagnetic radiation can propagate within and as, in effect, defining a transmission path of the beam through the optical fibre.

A "single mode" fibre is an optical fibre that only supports one mode (path) through the fibre, for example because its core and numerical aperture are so small that, in effect, radiation can only propagate along the axis of the fibre.

A "multimode" fibre on the other hand will support multiple modes or transmission paths through the fibre, such as a mode that travels along the axis of the fibre and other modes where the beam path travels at an angle to the axis of the fibre and undergoes total internal reflection at the boundary between the core and cladding of the fibre as it propagates down the fibre. Multimode fibres typically have a larger core diameter and/or numerical aperture than single mode fibres, so that they will support multiple transmission modes.

Single mode fibres can be useful because as there is only a single transmission mode (path) through the fibre, the geometry of their output beams (e.g. in terms of the beam diameter and numerical aperture) tends to be stable over time.

However, there can be situations in which a multimode fibre may be preferred. For example, in certain applications, such as fluorescence imaging of samples and flow cytometry, it can be important to achieve a uniform intensity distribution across the sample being analysed (i.e. to have the same intensity across the entire cross-section of the sample-illuminating laser beam). The output beam from a single mode fibre has a Gaussian power distribution, and therefore, to achieve a uniform intensity distribution across the output beam cross-section, additional optics are required.

On the other hand, a multimode fibre more naturally produces a uniform intensity cross-section output beam, and, indeed, would produce an output beam having this form if all the available modes in the fibre were "excited" (i.e. had electromagnetic radiation propagating along them).

A multimode fibre that has all its modes "excited" is typically referred to as being "filled", since the electromagnetic radiation is propagating in all available modes in the fibre.

However, a difficulty with using multimode fibres is that it can be difficult in practice to "fill" the fibre efficiently with electromagnetic radiation, i.e. to excite efficiently all the transmission modes that the fibre supports. This is because a typical laser beam that is launched into an optical fibre may be a single mode laser (i.e. where the output beam from the laser source propagates in a single, very small range of angles) and/or may have a restricted angular and/or spatial distribution, such that the input beam will not fill the entire acceptance angle cone and/or radiation-accepting cross-section of the multimode fibre. In this case, the input beam may only travel along a few of, rather than all of, the modes that are supported by the fibre (i.e. such that only a subset of the available transmission modes in the fibre will be excited by the laser beam).

Similar issues arise in the context of other electromagnetic radiation sources, such as other more spatially coherent sources, such as super-luminescent LEDs. Again, a super-luminescent LED may be unable in itself to "fill" all the modes of a multimode optical fibre.

A problem that arises when electromagnetic radiation propagates via only some but not all of the modes available in a multimode fibre is that this can make the output beam less consistent and not uniform over time. For example, any disturbance of the fibre in use, or variation in the launch conditions of the beam into the fibre (such as the launch alignment), can cause the "subset" of modes that the radiation is propagating via in the fibre to change. This in turn can lead to a variation in the output of the fibre, for example in terms of the output beam's direction, size, shape, and/or intensity. For example if the input beam is "swept" across the end of the fibre, the beam in the fibre will "sweep" through the available transmission modes in the fibre, and the output beam will correspondingly sweep across a range of output angles.

These effects, together with effects such as relative dispersion and interference between different modes in a multimodal fibre, result in what is commonly referred to as "modal noise".

Figure 1:
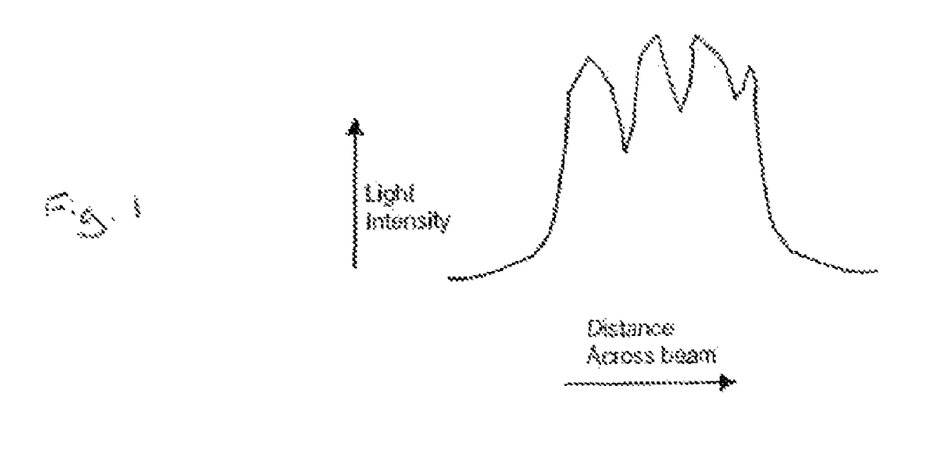
FIG. 1 shows an exemplary profile of a beam exiting a multimode optical fibre.

One important effect and drawback of modal noise is that the intensity distribution of a beam output by a multimode optical fibre typically is not uniform across the beam's cross-section. This is shown in FIG. 1, which shows an exemplary output beam profile (cross-section) from a typical multimode optical fibre (i.e. in its natural, "raw" state without any adjustment or modification of the fibre or the optical system).

It is accordingly known to try to remove or reduce these effects of modal noise in the output beam from a multimode fibre. Typically this is done by trying to ensure that more, and ideally all, of the modes supported by the fibre are excited (i.e. traveled along) by the beam of electromagnetic radiation, since if all the modes in the fibre are excited (i.e. the beam "fills" the fibre), any variation in, e.g., launch conditions, will not cause a change in the modes propagating in the fibre (as all modes are excited in any event) (and thus should not cause a change in the output beam).

One way to try to achieve this is to try to "launch" the beam from the source into the fibre in such a way that the beam, in effect, "overfills" the core diameter and numerical aperture of the fibre as it enters the fibre. This is intended to ensure that the beam "fills" all the modes in the fibre. Such arrangements typically seek to expand or diffuse the beam before it enters the fibre, i.e. to, in effect, provide an "extended" source that can then completely "fill" the fibre. Another known similar approach is to attempt to raster scan the beam across the input face of the fibre core, again so as to try to ensure that the beam "fills" the fibre.

However, a drawback with these arrangements is that the necessary optical, etc., arrangements tend to result in loss of power from the beam. The arrangements can also be complex to use and maintain.

Figure 2:
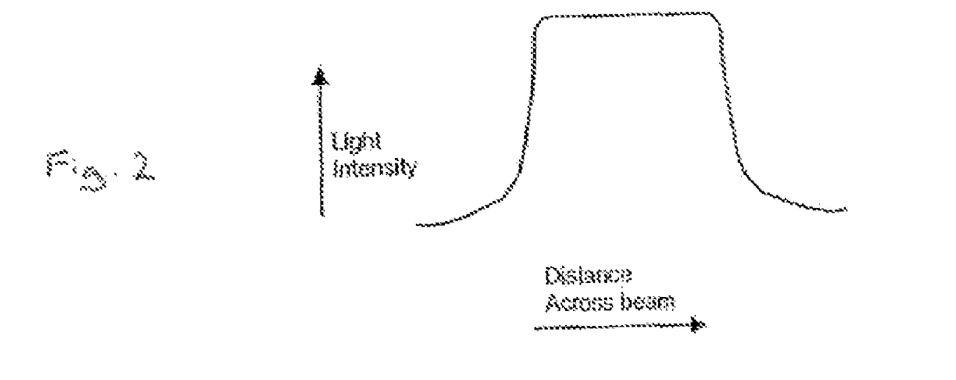
FIG. 2 shows the beam profile of a perfectly scrambled beam exiting a multimode optical fibre.

Another known technique for trying to excite all modes in a multimode optical fibre is known as "mode scrambling" (and the devices used to achieve this are typically referred to as "mode scramblers"). FIG. 2 shows schematically a perfectly "scrambled" output beam profile from a multimode fibre. It can be seen that the intensity of the beam is substantially uniform across the cross-section of the beam. The aim of mode-scrambling is to, in effect, make the overall geometry of the output beam (and in particular at least the beam diameter and numerical aperture) more stable over time, and, e.g., more robust to variable launch conditions (such as launch alignment). Mode-scrambling typically involves introducing perturbations into the optical fibre along its length, which perturbations will act to "excite" different and/or more modes in the fibre.

One known mode scrambling technique involves placing a series of bends of differing bend radii along the length of the optical fibre, for example by placing the fibre between two irregularly corrugated surfaces. This serves to "excite" extra propagation modes in the fibre, because at each bend, the beam will strike the core/cladding interface at a different angle or angles, thereby changing the angular distribution of modes in the fibre. The intention is that by forcing the beam around the bends of different radii as it travels along the fibre, these internal reflections will act to sweep the beam through and into all the modes that the fibre supports (i.e. to cause the beam to "fill" the fibre).

However, a disadvantage of this arrangement is that transmission losses may occur at each bend in the fibre, because, for example, one or more of the propagation modes may strike the cladding at an angle that does not cause total internal reflection (such that radiation is lost into the cladding).

It is also known to try to achieve mode scrambling by using a "daisy chain" of multimode fibres of different core diameters and/or numerical apertures. In this case, the intention is that as the beam passes from one fibre to the next in the "daisy chain", different or more propagation modes will be excited.

However, this arrangement can again cause transmission losses as the beam propagates through the fibres, as there may, for example, be losses at each interface between different fibre sections.

A third known mode scrambling technique is to include "scattering centres", such as non-optically clear regions, in a multimode optical fibre. Again, the intention is that the electromagnetic radiation (e.g. laser) beam will be "scattered" into different or more modes of propagation by the scattering centres. However, there is again a risk of transmission losses at each scattering centre that the beam encounters.

It is also known to use combinations of two or more of these techniques, but again this does not avoid the problem of transmission losses being caused by the "mode scrambling", etc.

Therefore, there remains scope for improvement to current mode scrambling techniques for use with optical fibres.

SUMMARY

One embodiment includes a method of performing mode scrambling in an optical fibre, where the method comprises dynamically forming a succession of differing perturbations in a portion of the fibre as a beam of electromagnetic radiation travels through the fibre.

One embodiment includes a method of performing mode scrambling in an optical fibre, where the method comprises vibrating a portion of the fibre as a beam of electromagnetic radiation travels through the fibre.

One embodiment includes an apparatus for performing mode scrambling for an optical fibre. The apparatus comprises a driver for dynamically forming a succession of differing perturbations in a portion of an optical fibre as a beam of electromagnetic radiation travels through the fibre.

One embodiment includes an apparatus for performing mode scrambling for an optical fibre. The apparatus comprises a driver for vibrating a portion of an optical fibre as a beam of electromagnetic radiation travels through the fibre.

One embodiment includes a system for performing mode scrambling for an optical fibre. The system comprises an electromechanical transducer to which an optical fibre may be coupled such that motion of the transducer will be imparted to the optical fibre and a signal generator for driving the transducer such that it vibrates and will thereby vibrate an optical fibre that is coupled to the transducer.

One embodiment includes one or more processor readable storage devices having processor readable code embodied on the processor storage devices. The processor readable code is for programming one or more processors to perform a method of performing mode scrambling in an optical fibre. One example method comprises dynamically forming a succession of differing perturbations in a portion of the fibre as a beam of electromagnetic radiation travels through the fibre. Another example method comprises vibrating a portion of the fibre as a beam of electromagnetic radiation travels through the fibre.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

A number of embodiments of the invention will now be described by way of example only and with reference to the accompanying drawings, in which.

DETAILED DESCRIPTION

According to a first aspect of the present invention, there is provided a method of performing mode scrambling in an optical fibre, the method comprising dynamically forming a succession of differing perturbations in a portion of the fibre as a beam of electromagnetic radiation travels through the fibre.

In the present invention, mode scrambling is performed by dynamically forming differing perturbations successively in a portion of the fibre. In other words, a series of differing perturbations are formed one after another, in time, in the same portion of the fibre.

This arrangement of the present invention should be contrasted with the prior art mode scrambling arrangements where a series of bends or other perturbations is arranged one after another along the length of the fibre (i.e. "spatially"). In the present invention the series of perturbations occurs dynamically, over time (i.e. "temporally"), i.e. such that at any given instant in time, the portion of the fibre is not exposed to all the different perturbations, but over time it will experience a series of different perturbations.

The perturbations that are dynamically formed in the portion of the optical fibre in accordance with the present invention will, as discussed above, cause a beam of electromagnetic radiation to excite different and/or more modes in the fibre as it encounters the perturbations.

Moreover, the Applicants have found that although at any given time the radiation beam may encounter only a limited number of perturbations in the portion of the fibre in which the perturbations are formed, as the beam encounters plural different perturbations over time, there is, in practice, and so far as the properties of the output beam are concerned, a similar effect in terms of exciting extra modes and filling the fibre (i.e. mode scrambling), as if the beam was passing through all the plural different perturbations in succession along the length of the fibre. In particular, although at any given time the perturbations in the portion of the fibre may not in themselves be sufficient (and, indeed, do not need to be sufficient) to perfectly "scramble" the output beam, the Applicants have found that if the output beam is considered over a longer period of time (e.g. relative to the rate at which the perturbations are formed in the fibre), then the output beam will have a sufficiently uniform, stable and robust geometry and intensity distribution, i.e. be "mode-scrambled".

In other words, the Applicants have recognised that one can replace a mode-scrambling series of static perturbations in the fibre (such as a linear series of bends, fibre-to-fibre interfaces and/or scattering centres along the length of an optical fibre), with an arrangement that instead dynamically forms a series of perturbations in the fibre over time. The effect of this is that fewer perturbations may be required in the fibre at any given time to achieve "mode-scrambling", such that the number of perturbations contributing to transmission losses as the beam travels along the fibre may be reduced.

Looked at another way, rather than having a large number of static perturbations (such as bends) connected in series in the spatial domain in the fibre to achieve mode scrambling as in the prior art mode-scrambling arrangements (which leads to cumulative transmission losses as the beam travels along the fibre), in the present invention perturbations are introduced into the fibre dynamically in use (i.e. sequentially in the time domain). As the mode-scrambling perturbations are added sequentially in the time domain in the present invention, each and every perturbation need not always be present at all times in the fibre, and thus at any given instant in time the number of perturbations contributing to transmission loss may be reduced as compared to a static system.

The present invention also extends to an apparatus suitable for carrying out the method of the present invention, and systems that implement the present invention.

Thus according to a second aspect of the present invention, there is provided an apparatus for performing mode scrambling for an optical fibre, the apparatus comprising:

means for dynamically forming a succession of differing perturbations in a portion of an optical fibre as a beam of electromagnetic radiation travels through the fibre.

According to a third aspect of the present invention there is provided an optical fibre system, comprising: a source of electromagnetic radiation; an optical fibre; means for launching a beam of electromagnetic radiation from the source of electromagnetic radiation into the optical fibre; and means for dynamically forming a succession of differing perturbations in a portion of the optical fibre as the beam travels through the fibre.

According to a fourth aspect of the present invention, there is provided a method of operating an optical fibre system, comprising: launching a beam of electromagnetic radiation into an optical fibre; and dynamically forming a succession of differing perturbations in a portion of the optical fibre as the beam travels through the fibre.

The perturbations that are dynamically formed in the portion of fibre in the present invention can be formed as desired. As discussed above, the intention is that the perturbations achieve a mode-scrambling effect. This means that, in effect, sufficient differing perturbations must be formed in the portion of the fibre at a rate that is sufficient that the output beam appears to be "mode-scrambled" over time. In other words, the dynamic forming of the perturbations in the fibre should act to average and smooth the observed output beam of the fibre over time.

In practice, this means that the forming of the different perturbations in the fibre should and preferably does occur at a rate that is relatively faster than any rate at which the output beam is to be observed or used, etc., such as, and preferably, the rate (e.g. the sampling rate) at which any measurements using the output beam are to be taken.

Thus, in a preferred embodiment, the perturbations in the fibre are formed at a rate that is at least 10 times, preferably at least 100 times, faster than the rate of any (series of) measurements, e.g., sampling, to be or being carried out using the beam of electromagnetic radiation.

Thus, in a particularly preferred embodiment, the perturbations are formed in the fibre at a rate that is faster than, and preferably substantially faster than, the rate at which individual measurements are being made or taken using the output beam from the fibre.

In other words, it is preferred that the portion of the fibre is formed into a plurality of differing perturbations within any period of time between which and/or over which individual measurements are to be made using the output beam from the fibre.

Similarly, it is preferred for the perturbations also, or instead, to be formed in the fibre relatively rapidly in relation to any time period over which the output beam is to be observed or used, etc., such as, and preferably, any period over which a (single) measurement using the output beam from the fibre is to be taken.

Thus, the fibre portion is preferably perturbed such that it is exposed to a plurality of differing perturbations during any time period over which an individual measurement is made using the output beam from the fibre. For example, if the output beam is to be observed or used over and/or for a given time period to take a single measurement, the fibre portion is preferably formed into a plurality of differing perturbations during this time period.

It is accordingly preferred that the perturbations are formed at a rate such that the portion of the fibre is formed into a plurality of different perturbations in a particular time period, e.g., and preferably, per second.

The perturbations are preferably continually, preferably continuously, formed in the fibre portion in use, rather than, e.g., there being any pauses in the process of forming the perturbations in use. In other words, the fibre is preferably repeatedly, more preferably continually, most preferably continuously, perturbed in use.

Preferably the arrangement is such that the perturbations formed in the fibre serve, so far as the output beam is concerned, to excite substantially all of the modes within the fibre over a given, preferably predetermined, time period, such as, and preferably, a few hundred milliseconds (although a shorter time period may be desirable if the period of time between individual measurements is similar to, or less than, this time period).

Thus, in a particularly preferred embodiment the fibre is formed into a particular, preferably selected, preferably predetermined, number of different perturbations within a particular, preferably predetermined time period. As discussed above, the particular time period is preferably relatively short as compared, e.g., and preferably, to a time period over which a measurement using the output beam is to be made.

In a particularly preferred embodiment, the portion of fibre is formed into a continuously randomly varying sequence of perturbations (as using a random sequence should achieve the best "mode scrambling"). However, the Applicants have recognised that achieving a random sequence of perturbations in practice may be difficult, and that, in fact, less random sequences will also suffice. Thus, in another preferred embodiment, the fibre portion is repeatedly formed into a, preferably predetermined, sequence of differing perturbations, e.g., and preferably, such that the portion of fibre is repeated cycled through the sequence of perturbations over time.

The perturbations that are formed in the portion of the fibre can take any suitable and desired form (that will affect the modes that are excited in the fibre in use). For example, they could comprise introducing different stresses into the fibre portion distorting or moving the fibre portion.

In a preferred embodiment the perturbations have the same basic form or nature, but the perturbation differs, e.g., in size, extent and/or configuration over time. For example, the perturbations could, e.g., comprise bends in the fibre, with the bend radius varying over time.

Indeed, in a particularly preferred embodiment, the perturbations are formed in the fibre portion by bending or forming the fibre portion into different shapes, as such disturbing or perturbing of the fibre can be more straightforward to achieve on a dynamic basis.

Thus, in a particularly preferred embodiment, the perturbations are formed in the fibre by forming bends of differing radii successively in the portion of the fibre, i.e. such that a succession of bends having different radii are formed one after another, in time, in the same portion of the fibre. The effect of this is that the same point (a single point) on the optical fibre will experience, over time, a variety of different bend radii, one after the other. This has been found to be particularly effective and convenient way of dynamically perturbing an optical fibre to achieve "mode scrambling".

Thus, according to a fifth aspect of the present invention, there is provided a method of performing mode scrambling in an optical fibre, the method comprising: forming a portion of the fibre successively into bends of differing bend radii as a beam of electromagnetic radiation travels through the fibre.

According to a sixth aspect of the present invention, there is provided an apparatus for performing mode scrambling for an optical fibre, the apparatus comprising: means for forming a portion of an optical fibre successively into bends of differing bend radii as a beam of electromagnetic radiation travels through the fibre.

According to a seventh aspect of the present invention there is provided an optical fibre system, comprising: a source of electromagnetic radiation; an optical fibre; means for launching a beam of electromagnetic radiation from the source of electromagnetic radiation into the optical fibre; and means for forming a portion of the optical fibre successively into bends of differing bend radii as the beam travels through the fibre.

According to an eighth aspect of the present invention, there is provided a method of operating an optical fibre system, comprising: launching a beam of electromagnetic radiation into an optical fibre; and forming a portion of the optical fibre successively into bends of differing bend radii as the beam travels through the fibre.

As will be appreciated by those skilled in the art, these aspects and arrangements of the present invention can and preferably do include any one or more or all of the preferred and optional features of the invention described herein, as appropriate.

In these arrangements where the fibre is perturbed by moving or bending it, it is preferred that the movement of the fibre varies over a timescale of a few milliseconds. Similarly, the repetition (vibration) rate of the fibre's movement (bending) is preferably of the order of a few milliseconds, and the fibre is preferably formed into a bend or bends having bend radii of the order of a millimetre or less. Furthermore, as discussed above, it is particularly preferred that the period of time in which the fibre is formed into a bend or bends of a particular bend radi is less than, and preferably substantially less then, the period of time between which and/or over which individual measurements are to be made using the output beam from the fibre, e.g. the rate of formation of the perturbations is relatively faster than the rate of any measurements (e.g. sampling) to be made using the output beam from the fibre. Furthermore, as discussed above, it is preferred that the period of time in which the fibre is formed into a bend or bends of a particular bend radii is less than, and preferably substantially less than, the period of time between which individual measurements are made using the output beam from the fibre (i.e. the repetition rate of the fibre's movement is preferably faster than the rate at which measurements are made using the output beam from the fibre). These arrangements have been found to be particularly effective for "mode-scrambling". In essence, the motion of the fibre must exercise the fibre (continuously) over a sufficient range of angles to provide the mode scrambling effect.

It should also be noted here that the bends, etc., that the portion of fibre is formed into need not be perfect arcs, or, indeed, curves, but can take any suitable form (e.g. that ensures that the fibre is exposed to a sufficient range of angles as it moved).

The portion of fibre in which the perturbations (e.g. bends) are dynamically formed can be selected and arranged as desired. For example, there could be a single portion of the fibre that is perturbed, or there could be multiple spaced portions that are so-perturbed. In a preferred embodiment only a single portion of the fibre is dynamically formed into perturbations (e.g. bends) in accordance with the present invention. In a particularly preferred embodiment, the portion (or portions) of the optical fibre in which the perturbations (e.g. bends) are formed comprises a loop (or loops) of the optical fibre.

The portion (or portions) of the optical fibre in which the perturbations are formed may similarly only have a single perturbation (e.g. bend) formed in it at any given time, or there may be (and, indeed, typically will be) a number of perturbations formed along the length of the fibre portion at any given time. (However, it should be noted here that even in an arrangement where there are plural, spatially distributed perturbations (e.g. bends) formed in the fibre portion in accordance with the present invention, there still can and will be in practice, significantly fewer bends in the fibre than in conventional, static, mode scrambling arrangements).

The portion of the optical fibre can be dynamically formed into the series perturbations in any desired and suitable manner. For example, the fibre could be mechanically bent into the desired shapes. In a preferred embodiment, a suitable driver, such as, and particularly, a transducer, is used to impart motion to the fibre to perturb it in the manner of the present invention.

In a particularly preferred embodiment, the portion of the fibre is perturbed by vibrating it. Vibrating the fibre has been found to be particularly convenient and effective mechanism for producing a dynamically varying sequence of perturbations in the portion of the optical fibre. In particular, as the fibre vibrates, a given point on the fibre will see a variety of bend radii.

Indeed, it is believed that such an arrangement may be new and advantageous in its own right.

Thus, according to a ninth aspect of the present invention, there is provided a method of performing mode scrambling in an optical fibre, the method comprising: vibrating a portion of the fibre as a beam of electromagnetic radiation travels through the fibre.

According to a tenth aspect of the present invention, there is provided an apparatus for performing mode scrambling for an optical fibre, the apparatus comprising: means for vibrating a portion of an optical fibre as a beam of electromagnetic radiation travels through the fibre.

According to an eleventh aspect of the present invention there is provided an optical fibre system, comprising: a source of electromagnetic radiation; an optical fibre; means for launching a beam of electromagnetic radiation from the source of electromagnetic radiation into the optical fibre; and means for vibrating a portion of the optical fibre as the beam travels through the fibre.

According to a twelfth aspect of the present invention, there is provided a method of operating an optical fibre system, comprising: launching a beam of electromagnetic radiation into an optical fibre; and vibrating a portion of the optical fibre as the beam travels through the fibre.

As will be appreciated by those skilled in the art, these aspects and arrangements of the present invention can and preferably do include any one or more or all of the preferred and optional features of the invention described herein, as appropriate. Thus, for example, the vibration of the fibre is preferably so as to dynamically form a succession of differing perturbations in the portion of the optical fibre, and most preferably acts to form bends of differing radii successively in the (vibrated) portion of the fibre.

In these arrangements and aspects of the invention, the portion of the fibre can be vibrated in any suitable and desired manner. It is preferably vibrated by engaging the fibre with a vibrating surface, for example by supporting the fibre on a vibrating stage or other device, such that forced vibration of the fibre will be effected. A mechanical vibration arrangement that uses direct agitation of the fibre could, for example, be used for this purpose. In a preferred embodiment, a suitable driver, such as a transducer, for moving or imparting motion to the fibre is used to vibrate the optical fibre in use.

As will be appreciated by those skilled in the art, in these embodiments where a vibration means or driver is used to vibrate the fibre, the optical fibre will need to be suitably coupled to the vibration mechanism or driver so that the vibration of the "vibrator" or driver, causes corresponding vibration of the fibre. In other words, the portion of the optical fibre to be vibrated needs to engage and/or be coupled to and/or mounted to the vibration mechanism or driver such that the displacement of the vibration mechanism or driver as it vibrates, displaces, and thereby vibrates, the (portion of) fibre. In effect, the vibration mechanism or driver will engage the optical fibre at one or more points along its length, and thereby vibrate the fibre.

Such coupling can be achieved in any suitable and desired manner, for example by resting the fibre on (a part of) the vibration means or driver. In such an arrangement, the fibre is preferably fixed to a support or other fixing in the vicinity of (near to) the vibration means or driver, so that it is held at that point, but then placed freely (without fixing it) on the vibration means or driver.

In a preferred embodiment, the optical fibre is fixed or attached to (a part of) the vibration mechanism or driver, as this helps to ensure more controlled vibration of the fibre. The fibre could be fixed at a single point to the vibration mechanism or driver, or at multiple points. The fibre may be fixed to the vibration mechanism or driver in any suitable manner, such as by using adhesive, a clamp, etc. Save for where the fibre portion is fixed to the vibration mechanism or driver (e.g. transducer), the fibre portion to be vibrated is preferably not otherwise fixed or attached to anything and is thereby otherwise left free to vibrate in space.

Thus, in a particularly preferred embodiment, the arrangement is such that a loop of fibre is fixed at its ends to a vibration mechanism, such as a transducer, but the loop is not otherwise fixed to anything and is free to vibrate in space.

It should be noted here that references to the fibre portion being free to vibrate and not being fixed relate to the portion of the fibre which is to be vibrated (i.e. perturbed in accordance with the present invention). As will be appreciated by those skilled in the art, the fibre may be, and indeed typically will be, fixed at other points along its length, for example at its ends. The requirement here is that there is a portion of the fibre that is free to vibrate.

In a particularly preferred arrangement of these embodiments and aspect of the invention, the vibration arrangement is arranged and configured such that there is substantially no relative movement in a direction along the length of the fibre between vibration mechanism and the fibre itself, where the vibration mechanism or driver engages and/or is coupled to the fibre. This helps to reduce the risk of vibration mechanism causing wear of the fibre (e.g. rubbing the fibre in use). (This can be important, as in some applications a "mode-scrambler" may need to operate continuously for long periods of time, such as months or years).

Preferably the arrangement is such that there is substantially no relative movement at all between the vibration mechanism or driver and the portion of the fibre where they engage and/or are coupled to, each other in use. This can be achieved, for example, by coupling or fixing the fibre to and/or supporting the fibre on, the vibration means or driver in such a manner that there should be no relative movement in use between the fibre and the vibration means or driver where the fibre is coupled to the vibration means or driver. For example, the fibre could be, and preferably is, coupled to the vibrating means or driver in such a manner that the fibre is continuously supported by (always engages) the vibrating means or driver whilst it is being vibrated.

It is believed that such arrangements may be new and advantageous in their own right, for example where it is desired to vibrate an optical fibre for whatever reason. Thus, according to a thirteenth aspect of the present invention, there is provided a system for vibrating an optical fibre, comprising: means for vibrating an optical fibre; and means for coupling an optical fibre to the means for vibrating the optical fibre in such a manner that there is substantially no relative movement between the optical fibre and the vibrating means at the point or points where the fibre is coupled to the vibrating means in use.

According to a fourteenth aspect of the present invention, there is provided a method of vibrating an optical fibre, comprising: coupling an optical fibre to a means for vibrating the optical fibre in such a manner that there is substantially no relative movement between the optical fibre and the vibrating means at the point or points where the fibre is coupled to the vibrating means in use.

Again, as will be appreciated by those skilled in the art, these aspects and embodiments of the invention can and preferably do, include any one or more or all of the preferred and optional features of the invention described herein, as appropriate. Thus, for example, the vibration preferably forms a series of differing bends in the optical fibre and/or a driver is used to vibrate the optical fibre in use.

It should be noted here that the references above and herein to there being substantially no relative movement between the optical fibre and vibration means where they engage in use, etc., are intended to reflect that the arrangement is so as to try, so far as is reasonably practicable, to prevent any such relative movement, but do not preclude any relative movement that may inevitably occur in use, even if the intention is to avoid such movement.

In a particularly preferred embodiment, the vibration arrangement is such that it (substantially) only imparts motion perpendicular to the longitudinal axis of the fibre at the point where it engages the fibre. In other words, the vibration mechanism or driver preferably can be arranged to, and is preferably arranged to, move only in a direction that is perpendicular to the longitudinal axis of the fibre portion that is being vibrated in use. This again helps to avoid any relative movement (and thus wear) between the fibre and the vibration mechanism in use.

This can be achieved, for example, and is preferably achieved, by having a vibrating mechanism or driver that moves reciprocally (reciprocates) in a single direction (along a single linear direction) only (e.g. vertically) and by then arranging the longitudinal axis of the fibre to be perpendicular to the direction of motion of the vibration mechanism or driver where the fibre engages and/or is coupled to the vibration means or driver (e.g. by laying the fibre horizontally on the mount of the vibration means or driver).

Thus, in a particularly preferred embodiment, the vibration means or driver is arranged such that it will, and/or comprises an arrangement that will, move (vibrate) reciprocally in a linear fashion (and preferably that only moves (vibrates) in the linear direction along which it reciprocates) in use.

It is again believed that such arrangements may be new and advantageous in their own right, for example where it is desired to vibrate an optical fibre for whatever reason. Thus, according to a fifteenth aspect of the present invention, there is provided a system for vibrating an optical fibre, comprising: means for vibrating an optical fibre; and means for coupling an optical fibre to the means for vibrating the optical fibre in such a manner that movement of the vibrating means imparts corresponding motion to the optical fibre at the point or points where the fibre is coupled to the vibrating means in use; and wherein: the means for vibrating the fibre moves reciprocally in a linear direction where it engages the optical fibre.

According to a sixteenth aspect of the present invention, there is provided a method of vibrating an optical fibre, comprising: vibrating an optical fibre by engaging it with a driving means that moves reciprocally in a linear direction where it engages the optical fibre.

Again, as will be appreciated by those skilled in the art, these aspects and embodiments of the invention can and preferably do, include any one or more or all of the preferred and optional features of the invention described herein, as appropriate. Thus, for example, the vibration preferably forms a series of differing bends in the optical fibre and/or a driver is used to vibrate the optical fibre in use.

In a particularly preferred embodiment, the optical fibre is vibrated using an electromechanical system, e.g., transducer, such as piezo-electric transducer, a moving-coil transducer, a solenoid, and/or a relay. Most preferably a moving coil transducer arrangement is used, as this type of transducer has been found to be more capable of effectively moving the fibre mass in use.

Such electromechanical vibration arrangements have the advantage that it is relatively straightforward to drive an electromechanical arrangement at a suitable vibration frequency, for example by using an appropriate signal generator, and they can be reliable in continuous use, and convenient for coupling the vibration of the transducer to the optical fibre. Another advantage of using an electromechanical arrangement, and, in particular, a piezo-electric, flat or coil-type transducer, is that vibration of the fibre can more readily be achieved with less or reduced wear of the fibre in use.

Thus, in a particularly preferred embodiment, the vibration means or driver includes or comprises an electromechanical transducer. Preferably, a coil-type transducer is used, and in a particularly preferred embodiment, a loudspeaker-type transducer arrangement is used to vibrate the fibre. Most preferably an audio exciter of the type used in flat-panel speaker applications is used, such as a suitable moving coil transducer or a disc-shaped piezo-electric bender. These have been found to be particularly effective transducers to use for vibrating the optical fibre.

Where an electromechanical arrangement, e.g., transducer, is used, then the system is preferably one that will produce appreciable displacement of the fibre over a range of frequencies. It preferably also produces only a minimal or relatively small amount of acoustic noise. Indeed, it is generally preferred for the vibration arrangement to be relatively quiet in use.

As will be appreciated by those skilled in the art, in arrangements that use an electromechanical transducer to vibrate the optical fibre, the transducer will need to be driven in an appropriate fashion. This can be carried out in any suitable manner, for example by using a suitable signal generator. Such a signal generator can accordingly preferably produce a range of waveforms and frequencies (preferably in the audio range), is preferably tunable (and once tuned, stable over a range of frequencies and operating conditions), and, as will be discussed further below, can preferably introduce a frequency modulation about a base (e.g. central) frequency, which frequency modulation is preferably configurable in terms of the frequency range that is swept through and the rate at which the sweep is undertaken.

It is again believed that such arrangements may generally be new and advantageous in their own right where it is desired to vibrate an optical fibre.

Thus, according to a seventeenth aspect of the present invention, there is provided a system for vibrating an optical fibre, comprising: an electromechanical transducer to which an optical fibre may be coupled such that motion of the transducer will be imparted to the optical fibre; and a signal generator for driving the transducer such that it vibrates and will thereby vibrate an optical fibre that is coupled to the transducer.

Again, as will be appreciated by those skilled in the art, this aspect of the invention can and preferably does include any one or more or all of the preferred and optional features of the invention described herein, as appropriate. Thus, for example, the electromechanical transducer preferably comprises a moving coil-type transducer.

The actual vibration that the fibre is subjected to in these arrangements can be selected as desired, although, as discussed above, the optical fibre should be vibrated at a rate that is sufficient to produce a sufficiently rapid varying sequence of bends or perturbations in the fibre. In view of this, in a particularly preferred embodiment, the fibre is vibrated at audio frequencies, such as, and preferably, in the range of 10 Hz-20 kHz. The fibre is preferably vibrated in the range of a few hundred hertz, preferably 50-400 Hz and in one particularly preferred embodiment at 100-120 Hz. Using audio frequencies, a single portion of fibre can be exposed to multiple bend radii per second.

As discussed above, the frequency of vibration of the portion of the optical fibre is preferably at least 10 times, more preferably at least 100 times, faster than the rate at which any measurements (e.g. sampling) using the beam from the fibre are to be made.

In one preferred embodiment, the frequency of vibration is varied over time in use for example by sweeping the vibration frequency through a, preferably particular, preferably predetermined, range of vibration frequencies, most preferably in a particular, preferably predetermined, period of time.

In a preferred such arrangement, the frequency of vibration of the fibre portion is swept across a range of a few tens of hertz about a reference, e.g. central, frequency in use, such as, and preferably over range of from 2 to 25 Hz about the reference (e.g. central frequency) (e.g., and preferably, such that the frequency of vibration of the fibre portion is swept over the range of f±2-25 Hz, where f is a central, reference, vibration frequency for the fibre).

In these arrangements, the frequency of vibration of the fibre portion is preferably swept through its range (e.g. from f+25 Hz to f−25 Hz) in a period of a few tens of milliseconds, e.g., and preferably in 5-30 milliseconds.

As discussed above, the "ideal" form of vibration for the fibre portion for achieving mode scrambling would be to subject the fibre portion to random vibration, e.g., in effect, "white noise". Thus in one preferred embodiment, the fibre portion is subjected to continual, random, e.g., "white noise", vibration.

However, the Applicants have found that in some cases it can be difficult to impart sufficient movement in the fibre portion if it is simply subjected to random, e.g., "white noise" vibration. Moreover, the Applicants have found that a particularly effective way to introduce sufficient movement in the fibre portion for the purposes of effective mode scrambling is to establish resonance in the fibre portion and/or driving transducer, as resonance will cause greater movement of the fibre portion.

Thus, in a particularly preferred embodiment, the vibration arrangement is such as to cause resonance in the driving vibration mechanism or in the fibre portion, or both.

As will be appreciated by those skilled in the art, in order to achieve resonance, a more restricted range of vibration frequencies as compared, e.g., to white noise, may need to be used. However, the Applicants have found that such "resonant" arrangements can still produce suitable mode scrambling effects, as will be discussed further below.

In such arrangements (and, indeed, in general), the portion of the optical fibre could, for example, be subjected to a single, "clean" input (driving) vibration, such as a sine-wave (sinusoid) of a particular, e.g., selected, frequency.

However, in a particularly preferred embodiment, the optical fibre is not simply subjected to a "clean", single, e.g., sine wave vibration, but instead, a more random or disrupted form of vibration is used. This helps to add "noise" to the frequency spectrum to which the fibre is exposed, thereby helping to randomise the vibrations and, e.g., bends formed in the fibre (which as discussed above has been found to provide an improved mode scrambling effect).

Such "disrupted" vibration can be achieved in any desired manner, for example by using a non-sinusoidal, such as a square or triangular wave, and/or disrupted, input (driving) vibration for the fibre, so as to introduce some distortion. A square or triangular driving waveform, for example, will include more harmonics than a sinusoidal driving waveform, and accordingly generate more random perturbation of the fibre portion in use.

However, in a particularly preferred embodiment, the fibre is subjected to a "base" vibration, such as, and preferably, a sine-wave vibration, and then distortion is introduced to the vibrating fibre portion.

Thus in a particularly preferred embodiment, the optical fibre is vibrated by first applying a base frequency vibration to the fibre portion, and then modulating or otherwise disturbing that vibration. The base frequency vibration is preferably in the form of a sine wave vibration that is applied to the fibre. The use of a sinusoidal base vibration is advantageous because it tends to produce less acoustic noise and less damage to the driving transducer, etc.

As discussed above, the base vibration frequency is preferably in the range of 50-400 Hz, and in one preferred embodiment is in a range of 100-120 Hz.

As discussed above, the base vibration frequency is preferably at least 10 times, more preferably at least 100 times, faster than the rate at which any measurements (e.g. sampling) using the beam from the fibre are to be made.

In a particularly preferred embodiment, the arrangement is such that the base, e.g., sine wave, vibration can and will set up a standing wave in the portion of optical fibre that is being vibrated (which standing wave is then disrupted and/or modulated in some manner). Thus, in a particularly preferred embodiment, a base, preferably sinusoidal, standing wave is set up in the fibre portion that is being vibrated, and then that standing wave is disrupted in some fashion to disrupt and "randomise" the vibration of the fibre portion.

Indeed, it is generally preferred that in these embodiments, a standing wave is established in the fibre portion (e.g. loop) that is to be perturbed, as the effect of a standing wave in the portion of the fibre is that the portion of fibre in which the standing wave is established will be subjected to a continuously varying sequence of bends of differing bend radii at the frequency of the driving motion (vibration) applied to the fibre.

Thus, in a particularly preferred embodiment, the present invention comprises means for or a step of establishing a standing wave in a portion of the optical fibre.

It is again believed that such arrangements may generally be new and advantageous in their own right.

Thus, according to an eighteenth aspect of the present invention, there is provided a method of vibrating an optical fibre, comprising: establishing a standing wave in a portion of the optical fibre.

According to a nineteenth aspect of the present invention, there is provided an apparatus for vibrating an optical fibre, comprising: means for establishing a standing wave in a portion of the optical fibre.

According to a twentieth aspect of the present invention, there is provided a system for performing mode scrambling in an optical fibre, comprising: an optical fibre; and means for vibrating a portion of the optical fibre; wherein the portion of optical fibre and the vibrating means are arrangeable such that a standing wave can be established in the vibrated portion of the optical fibre in use.

As will be appreciated by those skilled in the art, these aspects and embodiments of the invention can and preferably do include any one or more or all of the preferred and optional features of the invention described herein, as appropriate. Thus, for example, the standing wave is preferably established by driving the optical fibre using a sinusoidal driving vibration, and is preferably established in a loop of the fibre. Accordingly the portion of optical fibre and the vibrating means are preferably arranged such that a standing wave is established in the vibrated portion of the optical fibre in use.

Similarly, the standing wave, once established, is preferably disrupted in some fashion so as to help randomise the vibrations in the optical fibre. Equally, a beam of electromagnetic radiation is preferably transmitted through the fibre while the standing wave is present in the fibre.

Where a standing wave is set up in the fibre portion, then the number of nodes in the standing wave is preferably selected so as to enhance the efficacy of the "mode scrambling" effect. The number of nodes will depend, for example, on the length and configuration of the portion (e.g. loop) of optical fibre in question, the mass per unit length of the optical fibre and the frequency of the driving waveform. These factors can accordingly, for example, be used to set the number of nodes in the standing wave. It is accordingly preferred for the frequency of the (base) driving waveform (e.g. sine wave) to be selected so as to control the number of nodes in the standing wave.

It is also preferred to configure the arrangement so as to (try to) maximise the displacement of the standing wave. Again the base frequency of the driving waveform can be and preferably is selected so as to try to achieve this (taking account, e.g., of the length and configuration of the fibre portion, and/or the mass per unit length of the fibre).

Where a base vibration waveform, e.g., sine wave, and/or standing wave, is to be disrupted or disturbed so as to, e.g., try to randomise the vibrations in the optical fibre, then in one preferred such arrangement, the base, e.g., sine-wave vibration, and/or e.g., standing wave, is disrupted by adding a frequency modulation to the drive waveform, e.g., and preferably, to disrupt the standing wave (if any) and broaden the frequency spectrum.

In a particularly preferred such arrangement, the frequency modulation that is applied is so as to sweep the driving waveform through a range of frequencies about the base vibration frequency. As discussed above, such modulation preferably sweeps the driving frequency through a range extending a few tens of hertz each side of the base vibration frequency, e.g., and preferably, from between 2-25 Hz to each side of the base vibration frequency. Again, the frequency "sweep" preferably takes place over a period of a few tens of milliseconds, such as, and preferably, from 5-30 milliseconds.

In such arrangements, the modulation envelope is preferably adjustable so as to increase or decrease the range of swept frequencies around the central or base frequency, and/or in terms of the rate at which it sweeps across, and/or from end to end of, the frequency range. In general, the selection of the base frequency and the range and rate at which it is swept should be based, e.g., on trying to achieve the desired balance between suitable resonance of the fibre portion and applying a sufficiently "random" vibration to improve the mode-scrambling.

It would also be possible, e.g., to add plural modulations or additional waveforms to the base driving waveform, if desired.

Another advantage of sweeping the vibration frequency through a range of frequencies in use is that this will help to ensure that the system remains in resonance throughout its operation. As is known in the art, the resonant frequency of a given system can change in use, e.g., as components of the system "age". Vibrating the fibre portion using a range of frequencies helps to ensure that resonance is not lost if the resonant frequency of the system should change (e.g. drift) over time. Indeed, it is preferred in any event to sweep the driving frequency over time for this purpose.

In another preferred such arrangement, the vibrating fibre portion (e.g. the standing wave in the vibrating fibre portion) is mechanically disrupted as it vibrates, e.g., by using objects to restrict or disrupt the motion of the vibrating fibre portion. This will again disrupt and randomise the vibration of the fibre.

Thus, in one particularly preferred embodiment, the present invention includes steps of or means for mechanically disrupting and/or restricting the vibration of the fibre portion in use, for example, and preferably, by using stops or surfaces against which the fibre will impact as it vibrates in use.

Such a mechanical "restriction" arrangement can take any suitable and desired form. For example, there may be a single point of the fibre portion whose motion is restricted in this way, or there may be multiple points along the vibrating fibre length where the fibre's motion is impeded. In a preferred embodiment, any such mechanical "restriction" can be moved and adjusted in use, so that, e.g., the degree of disruption can be varied and adjusted in use.

It would also be possible, for example, to disrupt the vibration in the fibre and/or to provide a more random vibration in the fibre by using multiple different driving transducers, e.g., at different points along the fibre portion.

It would also be possible to use combinations of the above techniques, if desired. For example, the fibre portion could be subjected to a varying (modulated) drive waveform and mechanical disruption, if desired.

As can be seen from the above, in a particularly preferred embodiment of the present invention, the vibration arrangement for the fibre comprises subjecting a portion of the fibre to a sinusoidal vibration, and most preferably includes setting up a standing sine wave in a portion of the optical fibre. It then preferably further comprises disrupting the base sinusoidal vibration (e.g. and preferably, standing wave), for example, and preferably, by adding a frequency modulation to the sine wave, and/or by otherwise mechanically disrupting the vibration of the portion of the fibre.

As discussed above, although in one preferred embodiment of the present invention only a single portion along the length of the fibre is perturbed in the manner of the present invention, it would also be possible to have plural portions along the length of the fibre that are perturbed in the manner of the present invention. Thus, there may be, for example, plural loops along the length of the fibre that are perturbed in the manner of the present invention. Such arrangements may improve the mode scrambling effect.

Thus, in one preferred embodiment, plural portions of the fibre are perturbed in the manner of the present invention. In such an arrangement, each portion of fibre that is perturbed may be subjected to the same or different perturbations, and/or the same or different driving vibration and/or driving arrangement, as desired.

The present invention is applicable to and can be used with any form of optical fibre, although, as discussed above, it is particularly intended for use with multimode optical fibres. Thus, in a preferred embodiment, the optical fibre comprises a multimode optical fibre. The optical fibre can similarly have any suitable and desired construction, including, for example, as well as more conventional fibres, air-cored and photonic crystal fibres (PCF). The optical fibre could also, e.g., be a polarisation preserving (maintaining) fibre. This could be desirable where, for example, polarisation sensitive components and/or measurements are being used or made.

The beam of electromagnetic radiation that is carried by the fibre (and "mode-scrambled") can similarly be any suitable such beam. As will be appreciated by those skilled in the art, it will typically be, and is preferably, a laser beam (and thus the optical source is preferably a laser). Such as a laser beam could lie in the visible, infra-red or ultra-violet, etc., parts of the electromagnetic spectrum, as is known in the art.

However, the present invention can also be used with other sources of electromagnetic radiation, such as other more spatially coherent sources, such as LEDs, such as super-luminescent LEDs.

The present invention can be used whenever "mode-scrambling" of an optical fibre's output beam is required. As discussed above, it will have particular, albeit not exclusive, application in laser-based fluorescence instruments, imaging and measurements.

The present invention accordingly also extends to an optical instrument or optical system comprising the apparatus or system of the present invention, and to a method of operating an optical instrument or optical system that includes a method or the methods of the present invention. The optical instrument or system may comprise, for example, a microscope, a laser-based fluorescence instrument or system, a fluorescence microscope, a fluorescence correlation spectroscope, a flow cytometer, a micro-array sequencer, etc.

As will be appreciated by those skilled in the art, all of the aspects and embodiments of the invention described herein may and preferably do include any one or more or all of the preferred and optional features of the invention described herein, as appropriate.

The methods in accordance with the present invention may be implemented at least partially using software e.g. computer programs. It will thus be seen that when viewed from further aspects the present invention provides computer software specifically adapted to carry out a method or the methods herein described when installed on data processing means, a computer program element comprising computer software code portions for performing a method or the methods herein described when the program element is run on data processing means, and a computer program comprising code means adapted to perform all the steps of a method or of the methods herein described when the program is run on a data-processing system. The invention also extends to a computer software carrier comprising such software which when used to operate an optical system or instrument comprising data processing means causes in conjunction with said data processing means said system or instrument to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Figure 3:
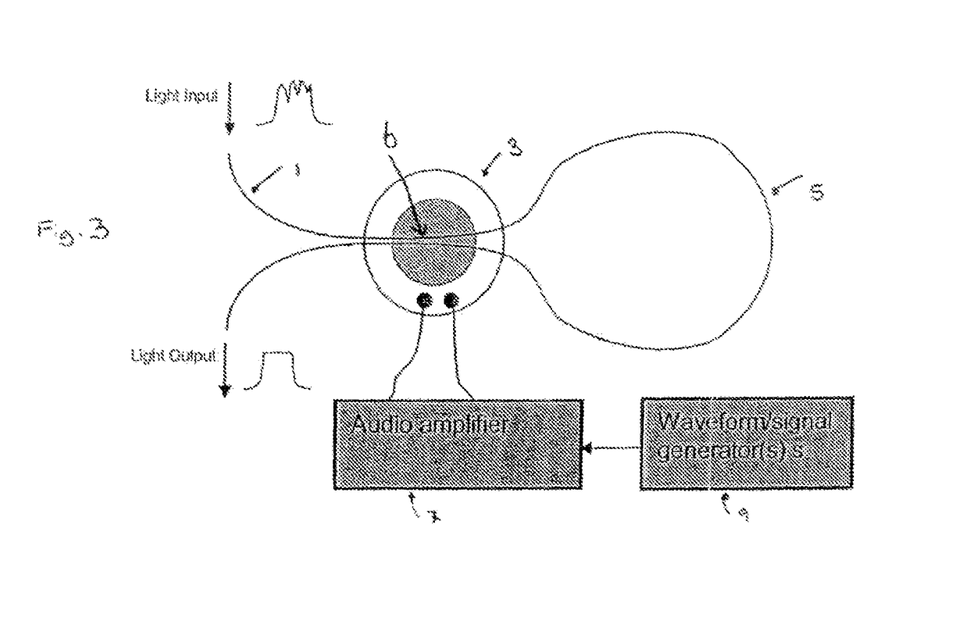
FIG. 3 shows an embodiment of an optical apparatus.
Figure 5:
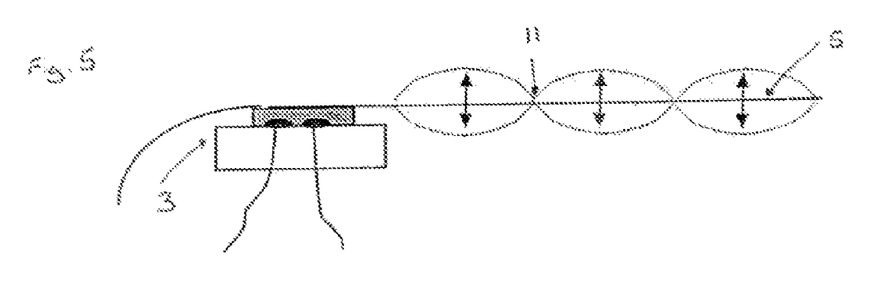
FIG. 5 shows a side view of the arrangement of FIG. 3 when in use.

FIG. 3 shows schematically an arrangement of an exemplary optical apparatus when viewed from above. FIG. 5 is a side view of this arrangement when in use.

As shown in FIG. 3, in the present embodiment, a portion of a multimode optical fibre 1 that is in the form of a loop 5 is arranged with its ends 6 mounted on a driver 3 for vibrating (particularly) the portion of the fibre in use. In this embodiment, the driver 3 is in the form of a transducer.

The loop of fibre 5 is fixed on the transducer (driver) 3 at its ends 6, but is otherwise left free to vibrate in space. The ends 6 of the optical fibre loop 5 are fixed to the transducer 3 in such a manner that in use there should be substantially no relative movement between the surface of the transducer 3 and the ends of the optical fibre 6 where the fibre is attached to the transducer 3. This helps to avoid any wear of the fibre 1 in use as it is vibrated by the transducer 3.

The transducer 3 comprises a moving coil or piezoelectric audio exciter of the type used in flat panel speakers. This transducer is driven by a signal generator 9 to cause it to vibrate, and thereby, as will be discussed further below, cause corresponding vibration in the loop 5 of the optical fibre.

The transducer 3 is arranged in this embodiment to vibrate reciprocally in a direction in and out of the plane of the drawing in FIG. 3.

The signal generator 9 that drives the transducer 3 is capable of producing a range of waveforms and frequencies in the audio range. It is tunable and once tuned is stable over a range of frequencies and operating conditions. It can also introduce a frequency modulation about a central or base frequency, which frequency modulation is configurable in terms of the range of swept frequencies and the rate at which the sweep is undertaken.

As shown in FIG. 3, an audio amplifier functional element 7 is also provided to impedance match the signal generator 9 to the transducer 3, and to supply power to the transducer 3. This component may be omitted, if it is not required. For example another device could be used to provide power to the transducer 3, in addition to, or instead of, the amplifier 7.

In the present embodiment, the signal generator 9 and transducer 3 are configured to be able to drive the transducer 3 at audio frequencies (10 Hz-20 kHz). These frequencies have been found to be suitable for use in the present invention, since at audio frequencies, a given vibrated segment or portion of fibre can be and will be exposed to multiple varying bend radii per second (which the Applicants have found is sufficient, with minimal averaging, to achieve smooth output beam profile).

The effect of the arrangement shown in FIG. 3 is that as the transducer 3 vibrates as it is driven by the signal generator 9, this causes the loop of fibre 5 also to vibrate, in a manner not dissimilar to a stringed musical instrument. As the loop 5 of the optical fibre 1 is vibrated in this manner, a given vibrated point in the fibre loop 5 will be exposed to a variety of bend radii, one after the other.

Figure 4:
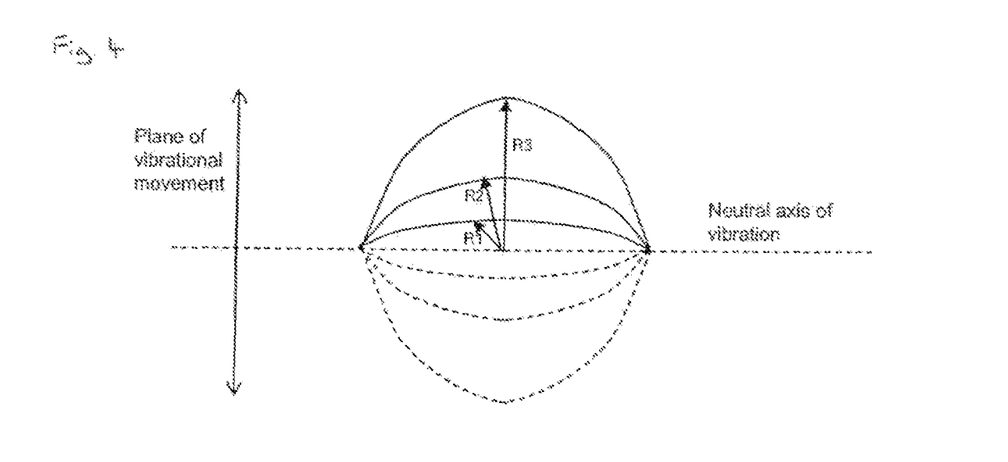
FIG. 4 shows a series of exemplary bend radii that a single portion of an optical fibre is exposed to when vibrated.

This is illustrated in FIG. 4, which shows how a portion of the optical fibre loop 5 will be vibrated sequentially through a variety of bend radii R1, R2 and R3, etc., by the vibrations of the transducer 3. In other words, as shown in FIG. 4, a given segment of the optical fibre will see a variety of bend radii over time as the fibre is vibrated, but will see only one bend at any given instant in time.

This all has the effect, as discussed above, that as a beam of electromagnetic radiation travels along the fibre as the fibre is being vibrated, new and/or different modes in the fibre are excited, thereby scrambling and effectively smoothing the beam in the fibre over time.

An embodiment for vibrating the loop of fibre 5 in use in order to achieve mode scrambling will now be described.

In this preferred arrangement for vibrating the loop of fibre 5 in use, a standing wave (at an audio frequency, as discussed above) is initially set up in the fibre loop 5 by applying a sine wave to the transducer 3 using the signal generator 9.

FIG. 5, which is a side view of the arrangement shown in FIG. 3, illustrates this. As can be seen in FIG. 5, a standing wave has been established in the loop 5 of the fibre 1.

The actual configuration of the standing wave, for example in terms of the number of nodes 11, will, as will be appreciated by those skilled in the art, be dependent on the loop configuration, the mass per unit length of the optical fibre 1, and the frequency at which the transducer 3 is driven. Each of these variables can be varied in use in order to control the efficacy of the mode scrambler.

In the present embodiment, the central frequency of the sine wave used to set up the standing wave is tuned to maximise the displacement of the standing wave (to cause resonance), and to control the number of nodes 11.

Once the standing wave has been established as shown in FIG. 5, in the present embodiment a frequency modulation is then added to the drive waveform to disrupt the standing wave. This is achieved by using the signal generator 9 to generate a modulation envelope which sweeps across a range of frequencies centred about the initial, "standing wave", drive frequency. This modulation envelope is adjustable both to increase or decrease the range of swept frequencies about the central frequency, and also in terms of the rate at which the modulation envelope is swept from one end of the frequency range to the other.

The effect of this frequency modulation to the drive waveform is to disrupt the standing wave in the fibre loop 5. This has the effect of broadening the frequency spectrum and vibration to which the fibre is exposed, and makes the vibration in the fibre more random (in effect, it serves to add "noise" to the vibration of the fibre). This helps to randomise the effect of the vibration on the modes travelling in the fibre, and thereby improves the "mode scrambling" effect.

In the present embodiment, a drive, central sine-wave frequency of 100-120 Hz is used, and the frequency is swept through a frequency range of the central frequency±between 2-25 Hz in a period of between 5-30 milliseconds. Other arrangements would, of course, be possible.

Other methods for broadening and randomising the frequency spectrum driving the transducer 3 could also or instead be used. For example, the amplifier 7 and/or transducer 3 could be distorted by overdriving them, and/or a non-sine waveform such as a triangular or square wave could be used to drive the transducer 3.

Figure 6:
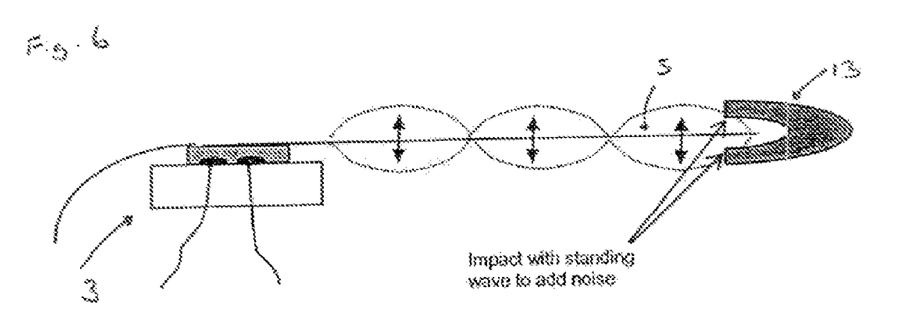
FIG. 6 shows a side view of a modified version of the arrangement shown in FIG. 3.

It would also or instead be possible to mechanically disrupt the standing wave, for example by causing the vibrating fibre to impact mechanical stops or restrictors. FIG. 6 illustrates this, and shows the standing wave in the fibre loop 5 being disrupted by impacting against a mechanical restrictor 13.

In these arrangements, the mechanical restrictor 13 can take any suitable configuration, and may, for example, be applied at multiple points along the vibrating fibre length (e.g. by using the same or plural mechanical restrictors). It would also, for example, be possible to arrange the mechanical restrictors to be movable along the fibre length, so that their effect on the vibrating fibre loop can be adjusted in use.

As will be appreciated by those skilled in the art, various changes and modifications may be made to the above described embodiments. For example, other arrangements for vibrating a portion of the optical fibre, such as not using a loop of the fibre, or using different vibration mechanisms, could be used, if desired. Similarly, other forms of moving-coil transducers or piezoelectric transducers, or relays, commercial speakers, shakers, solenoids, etc., could be used in place of the transducer 3 to vibrate the optical fibre.

It can be seen from the above described embodiments that an optical fibre mode scrambling arrangement is provided that can preferably make the overall geometry of the output beam (e.g., and particularly, in terms of the beam diameter and numerical aperture) more stable and robust, for example, and in particular, in relation to variable launch conditions (such as variable launch alignment), but with reduced transmission losses in use, as compared, for example, to known, "static" mode-scrambling systems.

This is achieved, preferably, by, instead of having static perturbations (such as bends or mismatched core interfaces) in the fibre to excite the full range of available modes, causing rapid bending and perturbation of the optical fibre using forced vibration. Moreover, by controlling the frequency spectrum of the vibration, it is possible to perturb the fibre rapidly through a very wide variety of bend radii as the beam passes through, such that a given portion of the fibre can be exposed to multiple bend radii per second, such that with minimal averaging, a smooth beam profile can be achieved. As the perturbations (e.g. bends) are added sequentially in the time domain rather than in the spatial domain, at any given instance in time the number of perturbations contributing to transmission loss can be significantly less than for a static system.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of performing mode scrambling in an optical fibre, the method comprising:
   dynamically forming a succession of differing perturbations in a portion of the fibre as a beam of electromagnetic radiation travels through the fibre;
   wherein the perturbations are formed at a rate that is faster than the rate at which the beam output from the fibre is to be observed or used.

2. The method of claim 1, wherein the perturbations comprise bends of differing bend radii that are successively formed in the portion of the fibre.

3. The method of claim 1, comprising:
vibrating the portion of the fibre to perturb it.

4. The method of claim 1, wherein the fibre comprises a multimode optical fibre.

5. The method of claim 3, wherein the portion of the fibre is vibrated by engaging the fibre with or coupling the fibre to a driver for vibrating the fibre.

6. The method of claim 5, further comprising:
fixing and/or attaching the fibre to the driver at one or more locations along the length of the fibre such that there is substantially no relative movement between the driver and the portion of the fibre at said one or more locations when the fibre is vibrated.

7. The method of claim 3, comprising:
vibrating the portion of the fibre by engaging it with a driver that moves reciprocally in a linear direction where it engages the optical fibre.

8. The method of claim 3, comprising:
establishing a standing wave in the fibre.

9. The method of claim 8, further comprising:
disrupting or disturbing the standing wave in the fibre.

10. An apparatus for performing mode scrambling for an optical fibre, the apparatus comprising:
a driver for dynamically forming a succession of differing perturbations in a portion of an optical fibre as a beam of electromagnetic radiation travels through the fibre;
wherein the driver is arranged to form the perturbations at a rate that is faster than the rate at which the beam output from the fibre is to be observed or used.

11. The apparatus of claim 10, wherein the driver for dynamically forming a succession of differing perturbations in the portion of the fibre comprises a driver for forming bends of differing bend radii successively in the portion of the fibre.

12. The apparatus of claim 10, wherein the driver for dynamically forming a succession of differing perturbations in the portion of the fibre comprises a driver for vibrating the portion of the fibre.

13. The apparatus of claim 10, wherein the fibre comprises a multimode optical fibre.

14. The apparatus of claim 12,
wherein the fibre is affixed to the driver at one or more locations along the length of the fibre such that there is substantially no relative movement between the driver and the portion of the fibre at said one or more locations when the fibre is vibrated.

15. The apparatus of claim 12, wherein the driver is arranged to move reciprocally in a linear direction where it engages the optical fibre in use.

16. The apparatus of claim 12, comprising:
a driver for establishing a standing wave in the fibre.

17. The apparatus of claim 16, further comprising:
a device disrupting or disturbing the standing wave in the fibre.

18. The apparatus of claim 12, wherein the driver comprises an electromechanical transducer, and the apparatus further comprises a signal generator for driving the transducer.

19. One or more processor readable storage devices having processor readable code embodied on said processor storage devices, said processor readable code for programming one or more processors to perform a method of performing mode scrambling in an optical fibre, comprising:
dynamically forming a succession of differing perturbations in a portion of the fibre as a beam of electromagnetic radiation travels through the fibre;
wherein the perturbations are formed at a rate that is faster than the rate at which the beam output from the fibre is to be observed or used.

20. A method of operating an optical fibre system, comprising:
launching a beam of electromagnetic radiation into an optical fibre; and
dynamically forming a succession of differing perturbations in a portion of the optical fibre as the beam travels through the fibre;
wherein the perturbations are formed at a rate that is faster than the rate at which the beam output from the fibre is to be observed or used.

21. An optical fibre system, comprising:
a source of electromagnetic radiation;
an optical fibre;
a beam launcher launching a beam of electromagnetic radiation into the optical fibre; and
a driver dynamically forming a succession of differing perturbations in a portion of the optical fibre as the beam travels through the fibre;
wherein the driver is arranged to form the perturbations at a rate that is faster than the rate at which the beam output from the fibre is to be observed or used.

22. The apparatus of claim 17, wherein the device is a frequency modulator or a mechanical restrictor.

* * * * *